United States Patent
Liu et al.

(10) Patent No.: US 7,945,009 B1
(45) Date of Patent: May 17, 2011

(54) JITTER MEASUREMENT

(75) Inventors: Jingfeng Liu, Longmont, CO (US);
Hongwei Song, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 806 days.

(21) Appl. No.: 11/838,617

(22) Filed: Aug. 14, 2007

Related U.S. Application Data

(60) Provisional application No. 60/823,208, filed on Aug. 22, 2006.

(51) Int. Cl.
*H04L 7/00* (2006.01)
*H04L 25/00* (2006.01)
*H04L 25/40* (2006.01)

(52) U.S. Cl. .......................... 375/371; 360/39; 708/446

(58) Field of Classification Search .................. 375/224, 375/226, 371; 370/516; 708/446, 490; 369/53.1, 369/59.21, 59.2, 124.05; 360/39; 702/69
See application file for complete search history.

(56) References Cited

U.S. PATENT DOCUMENTS

| | | | |
|---|---|---|---|
| 5,293,369 A * | 3/1994 | Melas et al. ............... 369/59.22 |
| 6,587,528 B1 * | 7/2003 | Wynn ............................ 375/362 |
| 6,598,004 B1 * | 7/2003 | Ishida et al. .................... 702/69 |
| 6,640,193 B2 * | 10/2003 | Kuyel ............................ 702/69 |
| 7,423,948 B2 * | 9/2008 | Kawabe et al. ............ 369/53.34 |
| 7,561,650 B2 * | 7/2009 | Ryue et al. ...................... 375/371 |
| 7,668,053 B2 * | 2/2010 | Haddad ....................... 369/44.34 |
| 2005/0185708 A1 * | 8/2005 | Yamaguchi et al. .......... 375/224 |

OTHER PUBLICATIONS

Blu-ray Disc, "White Paper Blu-ray Disc Format: 1.A Physical Format Specifications for BD-RE," 2nd Edition, Blu-ray Disc Association, Feb. 2006.

"Data Interchange on 120 mm and 80 mm Optical Disk Using +RW Format—Capacity: 4,7 and 1,46 Gbytes per Side (Recording speed up to 4X)," Standard ECMA—337, 3rd Edition, Dec. 2005.

"80 mm (1,46 Gbytes per side) and 120 mm (4,70 Gbytes per side) DVD Re-recordable Disk (DVD-RW)," Standard ECMA—330, Dec. 2002.

* cited by examiner

*Primary Examiner* — Jean B Corrielus

(57) ABSTRACT

A specialized structure measures clock-to-data jitter in an optical memory interface by averaging the result of two second-order estimates of zero crossing using measured signal values on either side of the zero crossing. In one embodiment, a first estimate uses two sample points before the zero crossing and one sample point after while the second estimate uses one sample point before the zero crossing and sample two points after. An existing clock associated with an internal analog-to-digital converter is used to evenly space the samples in time. To simplify the second-order estimate calculations, the three samples of the exemplary embodiment are give x values of −1, 0, and +1 respectively. Which of the two roots of the second-order estimates is used is based on the slope of the signal at the zero crossing.

19 Claims, 9 Drawing Sheets

JITTER MEASUREMENT

CROSS-REFERENCE TO RELATED APPLICATION

The present application claims the benefit of U.S. Provisional Application No. 60/823,208, entitled "JITTER MEASUREMENT," filed on Aug. 22, 2006, which is hereby incorporated by reference herein.

DESCRIPTION OF RELATED ART

Data-to-clock jitter is a critical specification for optical disks such as DVD or Blu-Ray. A dedicated piece of test equipment called a Time Interval Analyzer (TIA) is generally used to make such measurements. However, cost and accessibility of the TIA are often an issue. A jitter analyzer embedded in a DVD or Blu-Ray interface circuit can be helpful for system calibration, but current jitter analyzers using the output of a phase detector only give an indirect measurement. Further, phase detector-based jitter measurement accuracy is affected by phase detector noise, often making such a measurement unreliable.

SUMMARY OF THE DISCLOSURE

Jitter measurements may be made directly by sampling known output signals timed using a clock signal from an analog-to-digital converter (ADC). In an exemplary embodiment, data points are captured around a critical level, for example, zero. Two calculations of zero crossing are calculated and then averaged to arrive at a final estimated measurement. The first calculation of zero crossing time is made using two points before the zero crossing and one point after. The second calculation uses one point before the zero crossing and two points after. Each calculation shares the center two points, with the first calculation adding one point before the first shared point, the second calculation adding one point after the second shared point. Because the signal shape is generally parabolic, a second-order approximation may be used for the two zero-crossing calculations.

The calculations may be implemented in any number of techniques, such as a digital signal processor, programmable array, or an analog hardware implementation. An analog hardware implementation provides fast response times and minimal overhead in one embodiment. A square-root function used in the second-order approximation may be implemented using a look up table.

In one embodiment, a sample-and-hold circuit captures successive samples and summing circuits and comparators are used to determine when the output signal has made a zero crossing and the slope at the crossing. An analog circuit implementation of the second-order approximation of zero-crossing time may be used to allow nearly instantaneous results to be logged.

DETAILED DESCRIPTION

Figure 1:
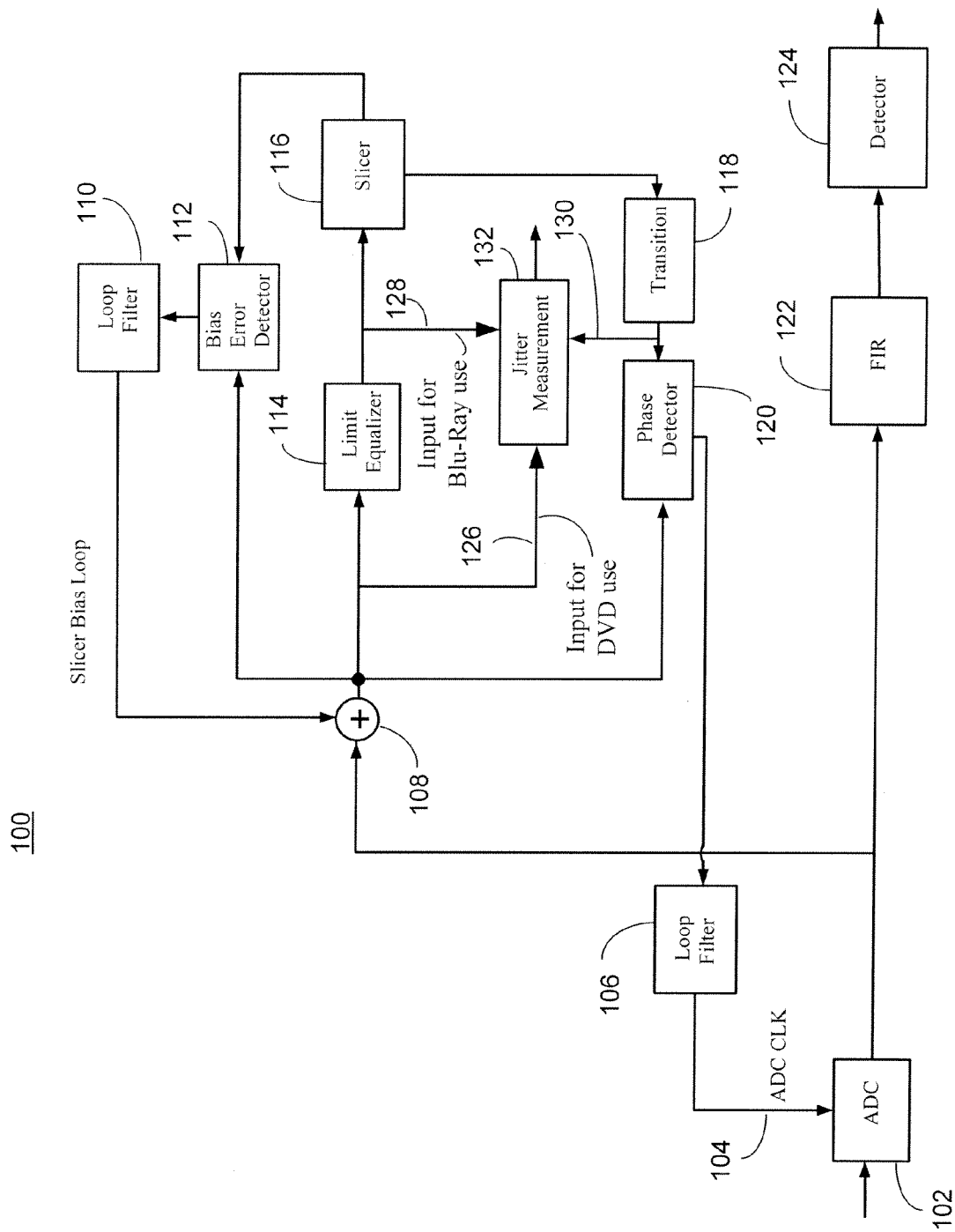
FIG. 1 is a simplified and representative block diagram of an optical drive signal processing circuit.

FIG. 1, a simplified and representative block diagram of a typical analog-to-digital converter (ADC) based timing loop 100 for an optical drive signal processing circuit. An ADC 102 passes samples of a signal to a finite impulse response filter 122 (FIR) and to a detector 124. The ADC 102 also drives an adder 108. The adder 108 drives a phase detector 120 that supplies feedback to a loop filter 106 for the ADC clock signal 104. The adder also drives a limit equalizer 114 that provides a signal to a slicer 116 driving a bias error detector 112 as a second loop filter 110 for generating feedback to the adder 108. The slicer 116 also provides an output to a transition detector 118. The transition detector 118 acts as a signal source that provides a timing signal 130 related to signal zero crossing. Beyond a typical timing loop circuit, the circuit of FIG. 1 includes a jitter measurement circuit 132 that uses the timing signal 130 and one of the two signals appearing on signal lines 126 or 128 depending on an application-specific embodiment. For a DVD media player, the signal on signal line 126 is used for the jitter measurement. For a Blu-Ray media player, the signal on signal line 128 is used for the jitter measurement. The jitter measurement circuit 132 is discussed in more detail below with respect to FIGS. 4 and 5.

Figure 2:
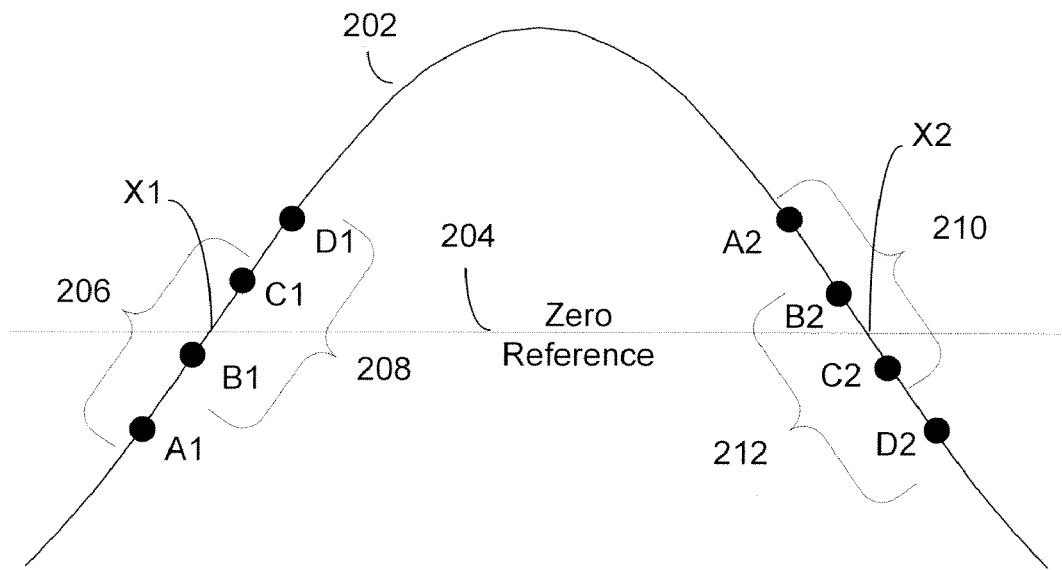
FIG. 2 is representative output waveform of the circuit of FIG. 1.

FIG. 2 shows a representative signal 202 with exemplary samples on each illustrated crossing of a zero reference 204. While the signal 202 may represent digital data streaming from a disk, parasitic capacitances, frequency response of components, etc. cause the ideal square wave shape to become a curved shape, often having a parabolic or sinusoidal shape. For the purpose of illustration, a parabolic approximation of the signal may be used, especially around the region of zero crossings at times X1 and X2.

The equation of a second-order parabolic is given by:

$$y = ax^2 + bx + c \quad (1)$$

or, solving for x, gives the two solutions:

$$x = \frac{-b \pm \sqrt{b^2 - 4ac}}{2a} \quad (2)$$

where using three points with arbitrary values of $(-1, y_{-1})$, $(0, y_0)$, and $(1, y_{+1})$ gives coefficients:

$$a = y_{-1} + y_1 - 2y_0 \quad (3)$$

$$b = \frac{y_1 - y_{-1}}{2} \quad (4)$$

$$c = y_0 \quad (5)$$

Applying these equations to the waveform of FIG. 2, four samples of the waveform may be taken at even time intervals on both the negative-to-positive zero crossing (X1) and the positive-to-negative zero crossing (X2). When calculating the time at which positive-going zero crossing, X1, occurs, the solution:

$$x = \frac{-b + \sqrt{b^2 - 4ac}}{2a} \quad (6)$$

may be used. The calculation for the negative-going solution, X2, may use the solution $$x = \frac{-b - \sqrt{b^2 - 4ac}}{2a}. \quad (7)$$

Two solutions for each zero crossing may be made and the results averaged to arrive at a time for the respective zero crossing. For example, to interpolate the zero crossing time of X1, a first solution using a first group 206 of samples A1, B1, and C1. The samples are taken using an analog-to-digital converter (ADC) at even time spacings using the ADC clock. By assigning the samples A1, B1, and C1 to have x values of −1, 0, and +1 respectively, the computational load is reduced and a first value, X1a, may be calculated.

Similarly, a second solution may be developed using a second group 208 of samples B1, C1, and D1. Assigning points B1, C1, D1 to have x values of −1, 0 and +1 respectively, a second solution X1b may be developed. A final value for X1 may be calculated using an arithmetic mean:

$$X1 = \frac{X1a + X1b}{2} \quad (8)$$

The same procedure may be followed to determine the zero crossing time for the negative-going solution using group 210 points A2, B2, and C2 with x values of −1, 0, and +1 respectively. This solution X2a may be averaged with solution X2b calculated using points B2, C2, and D2 with x values of −1, 0, and +1 respectively, that is:

$$X2 = \frac{X2a + X2b}{2} \quad (9)$$

Figure 3:
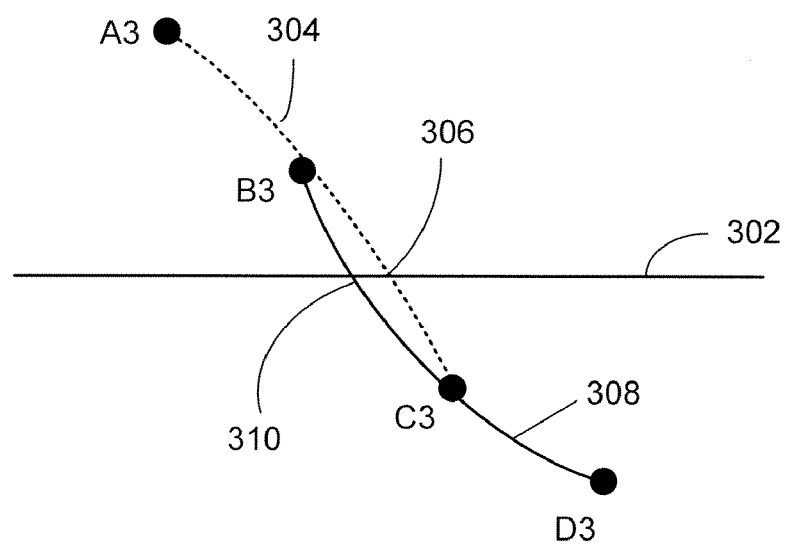
FIG. 3 is a detail showing approximations of a zero crossing of the representative output waveform of FIG. 2.

FIG. 3 shows a detail of the use of the above technique for a negative-going signal transition. Four sample points A3, B3, C3, and D3 are taken at equal time intervals on each side of a critical level crossing 302, for example, zero. Other critical levels may used when DC offset or other circuit considerations are a factor.

The negative-going equation, #7 above, may be used to calculate a zero crossing time using points A3, B3, and C3 by generating an approximate curve 304 and solving for y=0, shown at point 306. Similarly, the same equation #7 above, may be used to calculate a second curve 308 giving point 310 at y=0. Averaging the y=0 results from the two equations yields an approximate time corresponding to jitter, since the reference input signal triggers the clock on the zero crossing. Because the center value of x is set to 0 for both calculations, the final value will be a time offset from zero.

Figure 4:
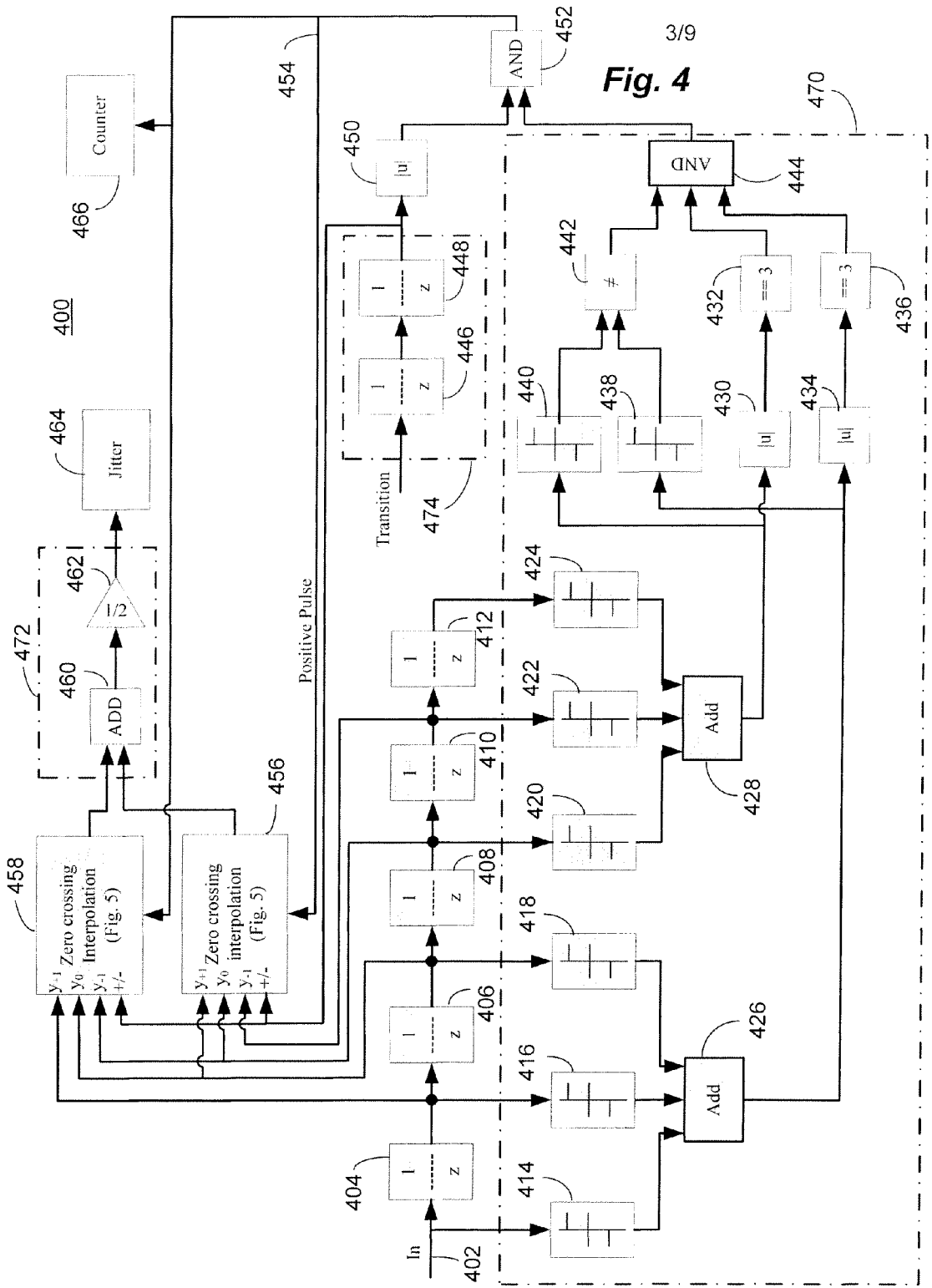
FIG. 4 is a simplified and representative block diagram of a jitter measurement circuit.

FIG. 4 illustrates an exemplary jitter measurement circuit 400. As discussed above, numerous capabilities exist for solving quadratic equations and the additional math steps required for the jitter measurement calculation, including digital signal processing, field programmable arrays, and, discrete components, as illustrated at the block diagram level by FIG. 4.

A signal input 402 receives a waveform provided by the appropriate signal line of FIG. 1, either 126 or 128. A first set of functions determines when successive samples are on either side of the critical level, e.g. a zero crossing, while a second set of functions performs the math associated with calculating the zero crossing value, described above. The first set of functions collectively describe a zero crossing detector 470.

The first set of functions to determine zero crossing uses a series of sample and hold registers 404, 406, 408, 410, 412 to create a series of six signal level values evenly spaced in time. Sign functions 414, 416, 418, 420, 422, 424, 438 and 440 output a value of +1 if the input is positive and output a value of −1 if the input is negative, or more correctly, the output reflects whether the input is above or below a critical value, such as zero. A first group of sign functions 414, 416, and 418 feed adder 426. The output of the adder 426 may be +3, +1, −1, or −3, depending on the state of its associated sign functions. A second group of sign functions 420, 422, 424 feed adder 428. Similar to adder 426, the output of the adder 428 may be +3, +1, −1, or −3. The first group of sign functions reflect the sign of the latest three samples, including the current value, while the second group of sign functions correspond to the oldest three samples.

The output of the adders 426 and 428 are each used in two ways that determine when the oldest samples at registers 408, 410, and 412 are of the same polarity. The newest samples at the input 420 and registers 404 and 406 must be the same polarity and opposite that of the oldest samples. The output of adder 426 passes through an absolute value function 434 and is compared to the number 3 at comparator 436. If true, the output of comparator 436 is 1, otherwise, the output is zero. This process ensures that all values are of the same polarity. Similarly, the output of adder 428 will be +3 or −3 only if all its associated samples are the same polarity. The output of absolute value function 430 will trigger a +1 output at comparator 432 only if the output of adder 428 is +3 or −3.

The output of adders 426 and 428 also feed sign functions 438 and 440 respectively. The output of each sign function will be positive if the input is positive and vice versa. The output of sign functions 438 and 440 are fed to comparator 442, which will output a value of 1 only if its two inputs are not equal. The output of comparators 432, 436, and 442 are fed into 'and' function 444. Only if all three inputs of 'and' function 444 are 1, will the output be 1. This will happen only when all of the three oldest samples have one sign (positive or negative) and all of the three newest samples have the opposite sign.

The transition input indicates a change in sign of the input signal and is received from the transition detector 118 of FIG. 1. The transition input feeds sample and hold circuits 446 and 448, which make up slope detector 474. The output of sample and hold circuit 448 provides a positive/negative signal to the zero crossing circuits 456 and 458. The effect is to provide a trigger two sample times after a transition, which should also align with a sensed transition at the output of 'and' function 444. When the absolute value of the transition, that is, the output of absolute value function 450 and the output of 'and' function 444 are both 1, the output of 'and' function 452 is a 1 and may be used to set a counter 466, trigger zero crossing interpolation functions 456 and 458, or both.

In this exemplary circuit, where three values are used for zero crossing interpolation, the two samples closest to the zero crossing may be used in each separate calculation, while an adjacent more positive value may be used for one set of calculations and an adjacent more negative value may be used for the other calculation. In this example, the outputs of sample and hold registers 404, 406, and 408 are used for the first zero crossing approximation and the outputs of sample and hold registers 406, 408, and 410 are used for the second zero crossing approximation. The calculation of the zero crossings is discussed in more detail with respect to FIG. 5.

The two calculated values of zero-crossing interpolation from a first circuit implementing a quadratic function 456 and a second circuit implementing a quadratic function 458 are fed to a third circuit 472 for providing an average of the outputs of circuits 456 and 458. The third circuit 472 may be implemented using an adder 460 and the resulting sum divided by 2 by block 462. This average of the two calculations provides the desired output of the jitter measurement 464. Of course, more values can be used for the calculation by increasing the width of the respective sample and hold registers and associated calculation blocks.

Figure 5:
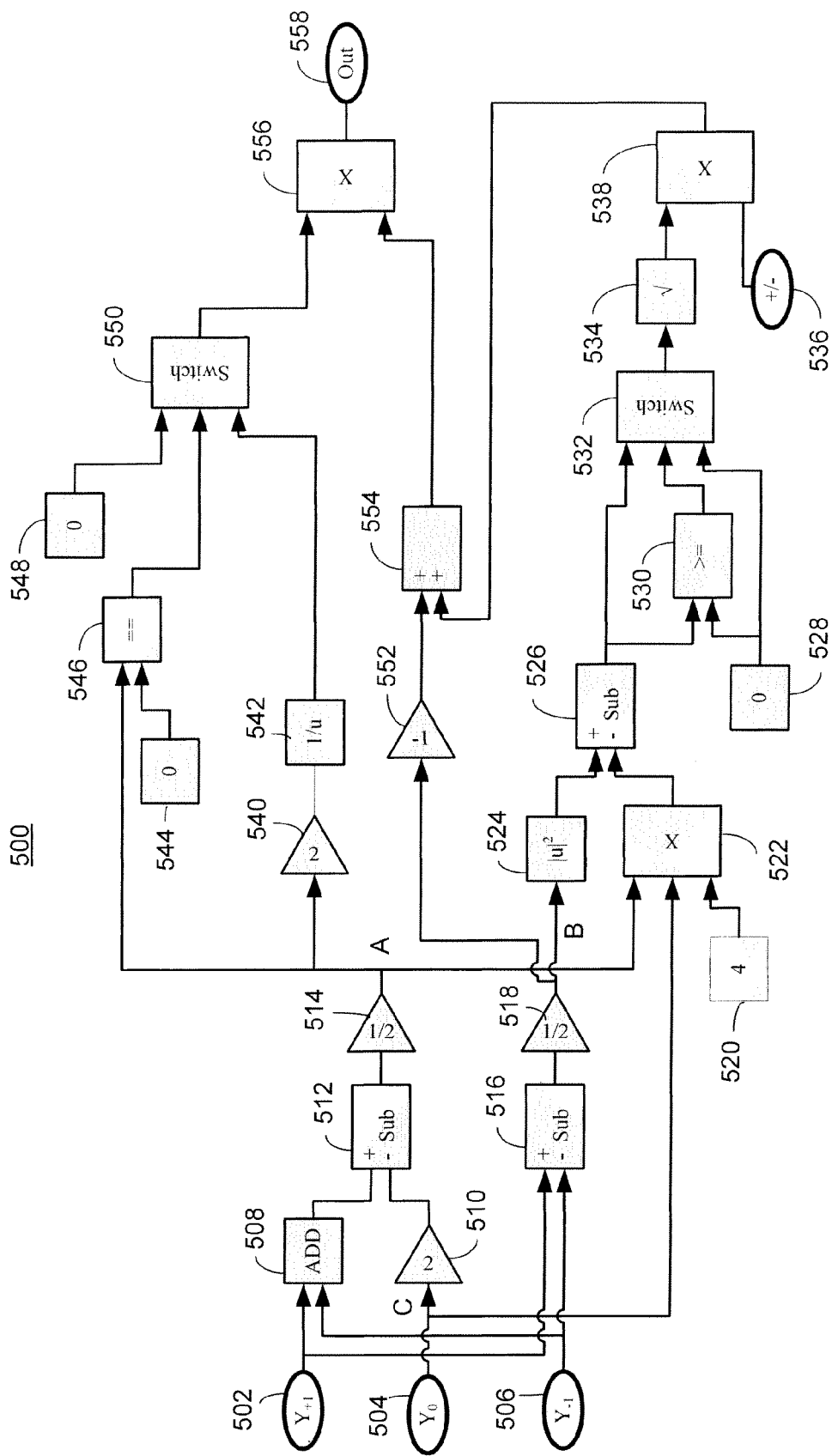
FIG. 5 is a simplified and representative block diagram of the zero crossing interpolation function of FIG. 4.

FIG. 5, a simplified and representative block diagram of a zero crossing interpolation circuit 500, similar to circuits 456 or 458 of FIG. 4, is discussed and described. As shown in FIG. 4, the circuit inputs 502, 504, and 506 have three consecutive samples with two samples on one side of the zero crossing and one sample on the other side of the zero crossing and are noted as $y_{-1}$, $y_0$, and $y_{+1}$ respectively. As discussed above, the x values are arbitrarily assigned as −1, 0, and +1 to simplify the calculation.

This circuit 500 primarily solves equation 2 above. Referring to equations 3, 4, and 5 above, coefficient $c=y_0$, so input 504 is equal to c. To find a, using equation 3, c is multiplied by 2 at block 510, block 508 adds y−1 and y+1 and block 512 subtracts the 2c result of block 510 to give y−1+y+1−2c and block 514 divides by 2 to give $a=y_{-1}+y_1-2y_0$. To solve for b, y+1 and y−1 are subtracted at block 516 and the result divided by 2 at block 518, yielding $$b = \frac{y_1 - y_{-1}}{2}.$$

Thus, the blocks 508, 510, 512, 514, 516, and 518 form a preliminary math circuit 570 that calculates the coefficients of the quadratic function.

The constant 4 is provided by block 520 and the output of multiplier 522 is 4ac. The output of magnitude squared block 524 is $b^2$. The subtraction process at bloc 526 yields $b^2-4ac$. The switch 532 allows management of anomalies using 0 value 528 and greater-than-or-equal block 530. The root function 534 may be implemented by a lookup table. The output of the root function 534 is then $\sqrt{b^2-4ac}$. The transition input 536 provides the slope of the signal using a +1 value for negative-to-positive transition and a −1 value for the positive-to-negative transition. The multiplier 538 applies the correct sign to the root function output, based on the transition type.

Block 552 changes the sign of b to −b and the adder 554 combines the output of multiplier 538 to the output of block 552. The output of adder 554 is either $-b-\sqrt{b^2-4ac}$ or $-b+\sqrt{b^2-4ac}$, depending on the sign of the transition at block 536.

Block 540 multiplies a by 2 and inverter 542 generates the result $$\frac{1}{2a}.$$

Switch 550 again allows management of anomalies using 0 value block 544 to compare if a=0 at block 546 and select 0 from block 548 when required. In the nominal case, the output of block 550 will be $$\frac{1}{2a}$$

and the result of multiplication block 556 will be the output 558 having a value of $$x = \frac{-b+\sqrt{b^2-4ac}}{2a} \text{ or } x = \frac{-b-\sqrt{b^2-4ac}}{2a},$$

depending on the slope or transition type of the signal (block 536).

Thus the solution of the quadratic is provided by the circuit of FIG. 5, although numerous equivalents from pure software, pure analog circuitry, digital signal processing or combinations may be used to solve the equation. The solution should be available in one sample time, to accommodate continuous processing.

Figure 6:
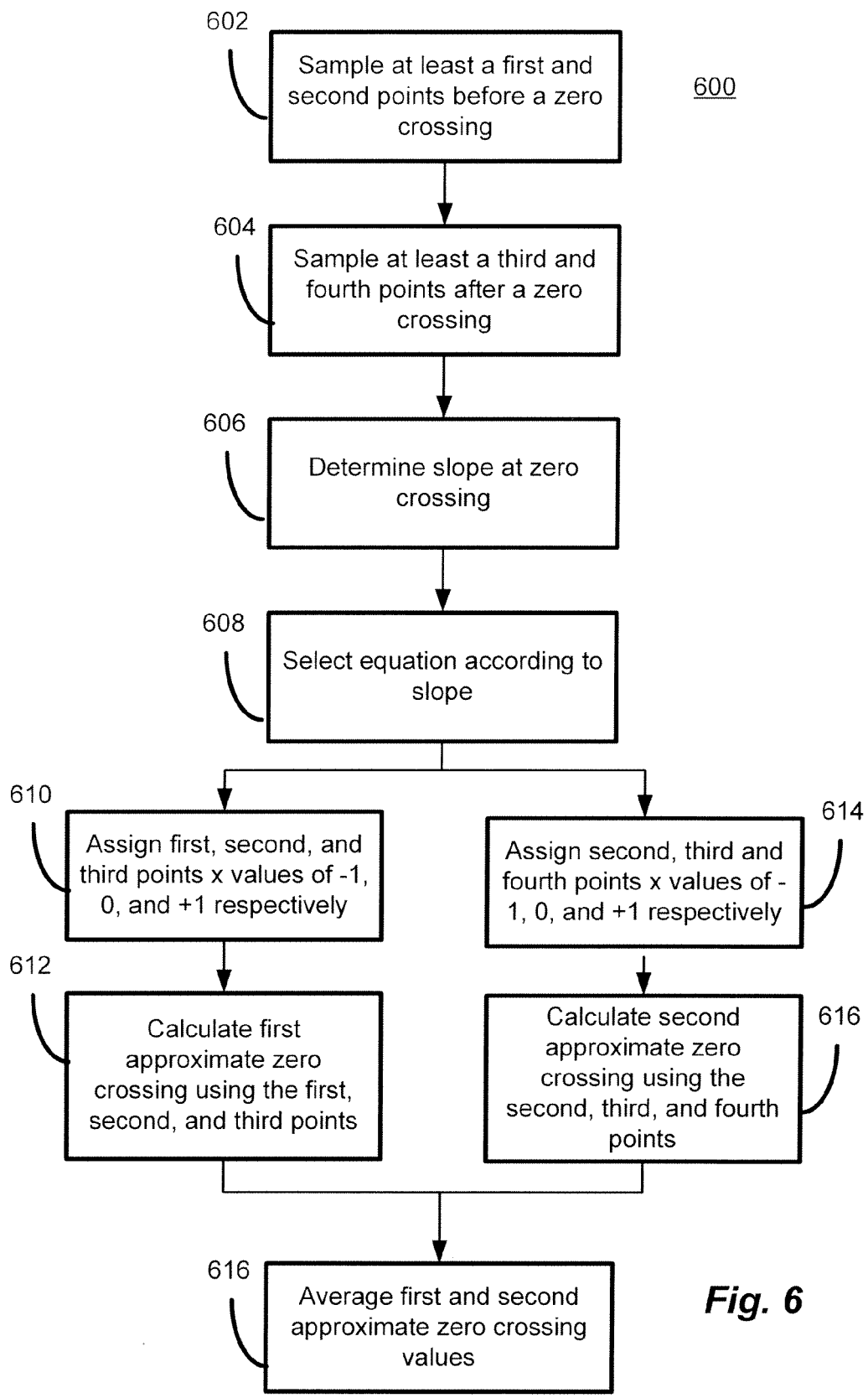
FIG. 6 is a flow chart illustrating a method of measuring jitter in a disk interface.

FIG. 6, a method 600 of measuring jitter in an optical disk interface is discussed and described. At block 602 at least a first and second samples of an output signal are taken before a zero crossing. At block 604, at least a third and fourth samples of the output signal are taken after the zero crossing, or other desired signal level. At block 606, the sign of the slope of the signal at the zero crossing may be determined and at block 608 the correct version of the quadratic solution may be selected. For example, $$x = \frac{-b+\sqrt{b^2-4ac}}{2a}$$

may be used if the slope of the signal is positive at the zero crossing and $$x = \frac{-b-\sqrt{b^2-4ac}}{2a}$$

may be used if the slope of the signal is negative at the zero crossing.

Processing may continue at block 610 where the first, second, and third samples may be assigned x values of −1, 0 and +1 respectively. At block 612, the appropriate version of the quadratic equation may be used to solve a first approximation of the zero-crossing value. At block 614, the second, third, and fourth samples may be assigned x values of −1, 0, and +1 respectively. At block 616, the same equation used at block 612 may be used to calculate a second approximation of the zero-crossing value. At block 616 the first and second zero-crossing values may be averaged to develop a final zero-crossing value. The deviation of the final zero-crossing value to the expected value is the data-to-noise jitter of the circuit.

The data-to-noise jitter may be adjusted by circuit calibration to be within defined standards of operation. For example, the ECMA-337 and ECMA-338 standards define jitter limits for the +RW and DVD-RW formats respectively. The Physical Format Specifications for BD-RE, $2^{nd}$ Edition define the jitter limits for the Blu-Ray disk format.

The use of two sets of overlapping data to develop an average zero-crossing value and the use of selected x values for both sets of overlapping data to minimize calculation meets the needs of manufacturers and original equipment manufacturers (OEMs) alike. Manufacturers can use the jitter measurement circuitry to distinguish their product over competitors. OEMs can speed the data calibration process and save on expensive test equipment that can lead to bottlenecks in production processes. The use of the inventive concepts disclosed above may save both time and cost to the ultimate benefit of the consumer.

FIGS. 7A-7F, illustrate various device in which jitter measurement such as described above may be implemented.

Figure 7A:
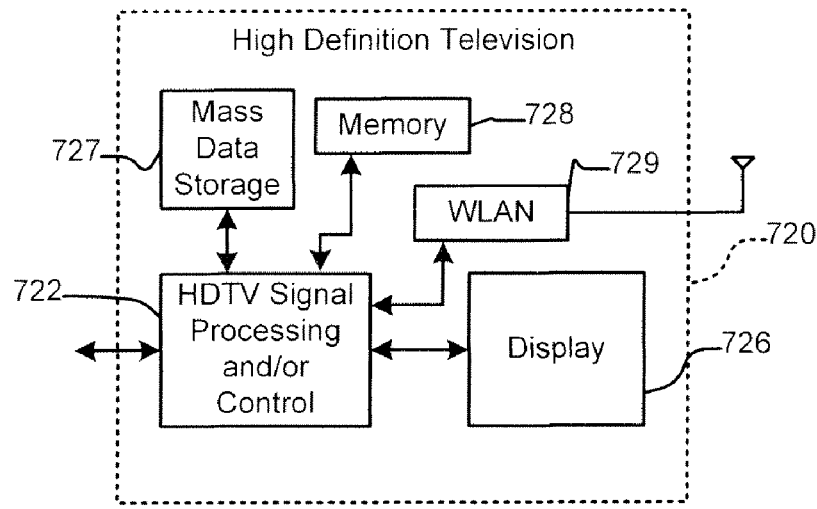
FIGS. 7A-7F illustrate exemplary embodiments incorporating the optical drive signal processing circuit.

Referring now to FIG. 7A, such techniques may be utilized in a high definition television (HDTV) 720. HDTV 720 includes a mass data storage 727, an HDTV signal processing and control block 722, a WLAN interface and memory 728. HDTV 720 receives HDTV input signals in either a wired or wireless format and generates HDTV output signals for a display 726. In some implementations, signal processing circuit and/or control circuit 722 and/or other circuits (not shown) of HDTV 720 may process data, perform coding and/or encryption, perform calculations, format data and/or perform any other type of HDTV processing that may be required.

The mass data storage 727 may implement a jitter measurement, for example. HDTV 720 may communicate with mass data storage 727 that stores data in a nonvolatile manner such as optical and/or magnetic storage devices. At least one mass storage device may utilize the circuit of FIG. 1. The mass storage device may be a mini HDD that includes one or more platters having a diameter that is smaller than approximately 1.8". HDTV 720 may be connected to memory 728 such as RAM, ROM, low latency nonvolatile memory such as flash memory and/or other suitable electronic data storage. HDTV 720 also may support connections with a WLAN via a WLAN network interface 729.

Figure 7B:
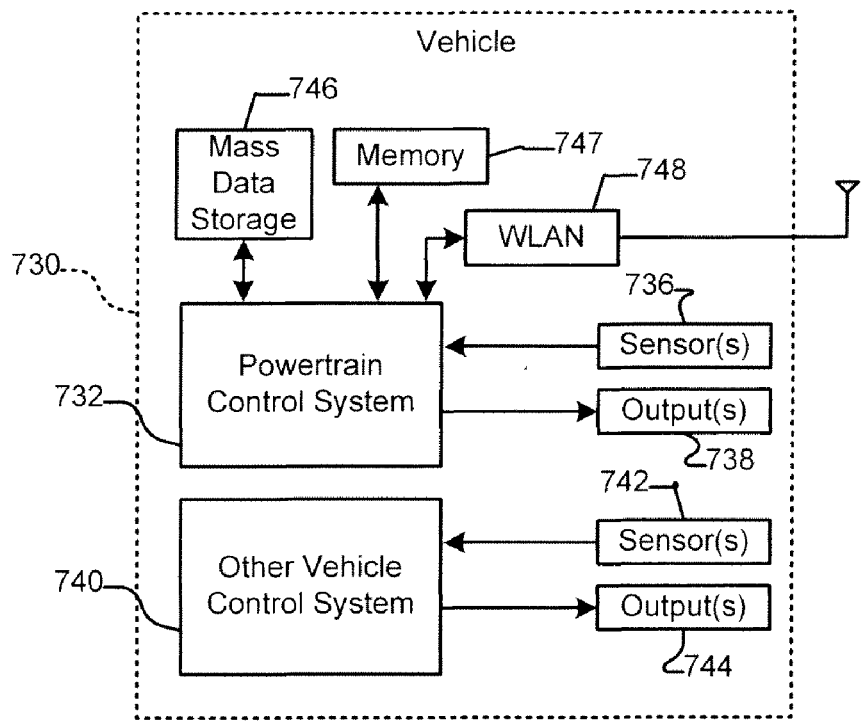

Referring now to FIG. 7B, such techniques may be utilized in a vehicle 730. The vehicle 730 includes a control system that may include mass data storage 746, as well as a WLAN interface 748. In some implementations, the jitter measurement may be used with the mass data storage 746. The mass data storage 746 may support a powertrain control system 732 that receives inputs from one or more sensors 736 such as temperature sensors, pressure sensors, rotational sensors, airflow sensors and/or any other suitable sensors and/or that generates one or more output control signals 738 such as engine operating parameters, transmission operating parameters, and/or other control signals.

The jitter measurement described may also be embodied in other control systems 740 requiring mass storage of vehicle 730. Control system 740 may likewise receive signals from input sensors 742 and/or output control signals to one or more output devices 744. In some implementations, control system 740 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 732 may communicate with mass data storage 727 that stores data in a nonvolatile manner such as optical and/or magnetic storage devices. At least one mass storage device may use the circuit of FIG. 1. The mass storage device 746 may be a mini HDD that includes one or more platters having a diameter that is smaller than approximately 1.8". Powertrain control system 732 may be connected to memory 747 such as RAM, ROM, low latency nonvolatile memory such as flash memory and/or other suitable electronic data storage. Powertrain control system 732 also may support connections with a WLAN via a WLAN network interface 748. The control system 740 may also include mass data storage, memory and/or a WLAN interface (all not shown).

Figure 7C:
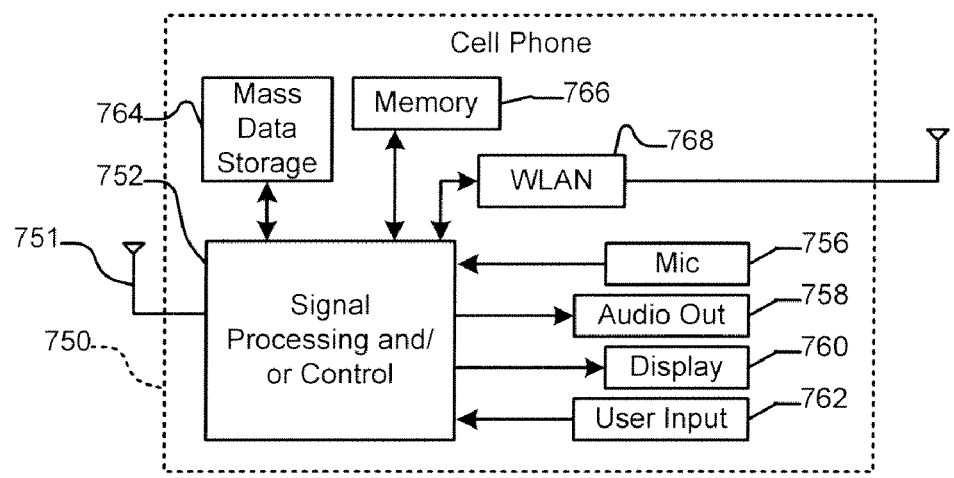

Referring now to FIG. 7C, such techniques may be used in a cellular phone 750 that may include a cellular antenna 751. The cellular phone 750 may include either or both signal processing and/or control circuits, which are generally identified in FIG. 7C at 752, a WLAN interface and/or mass data storage 764 of the cellular phone 750. In some implementations, cellular phone 750 includes a microphone 756, an audio output 758 such as a speaker and/or audio output jack, a display 760 and/or an input device 762 such as a keypad, pointing device, voice actuation and/or other input device. Signal processing and/or control circuits 752 and/or other circuits (not shown) in cellular phone 750 may process data, perform coding and/or encryption, perform calculations, format data and/or perform other cellular phone functions.

Cellular phone 750 may communicate with mass data storage 764 that stores data in a nonvolatile manner such as optical and/or magnetic storage devices for example hard disk drives HDD and/or DVDs. At least one HDD and/or DVD may use the circuit of FIG. 1. The HDD may be a mini HDD that includes one or more platters having a diameter that is smaller than approximately 1.8". Cellular phone 750 may be connected to memory 766 such as RAM, ROM, low latency nonvolatile memory such as flash memory and/or other suitable electronic data storage. Cellular phone 750 also may support connections with a WLAN via a WLAN network interface 768.

Figure 7D:
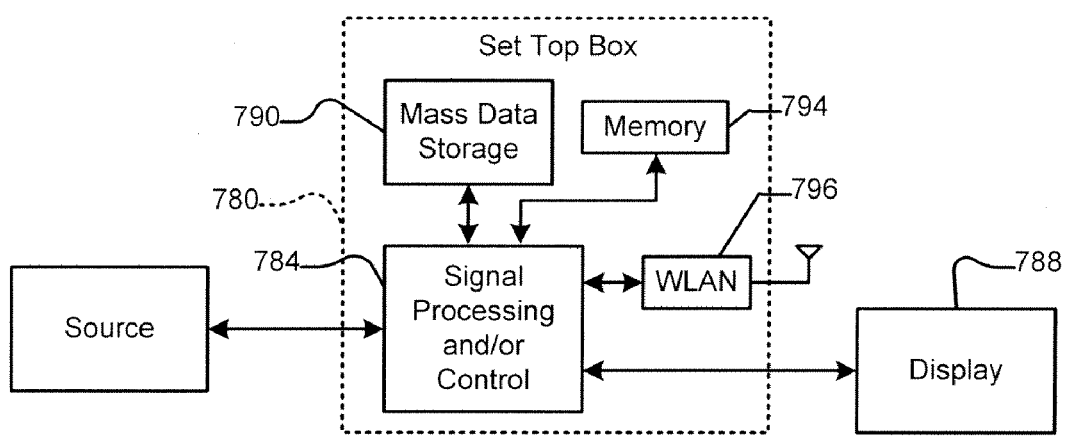

Referring now to FIG. 7D, such techniques may be utilized in a set top box 780. The set top box 780 may include either or both signal processing and/or control circuits, which are generally identified in FIG. 7D at 784, a WLAN interface and/or mass data storage 790 of the set top box 780. Set top box 780 receives signals from a source such as a broadband source and outputs standard and/or high definition audio/video signals suitable for a display 788 such as a television and/or monitor and/or other video and/or audio output devices. Signal processing and/or control circuits 784 and/or other circuits (not shown) of the set top box 780 may process data, perform coding and/or encryption, perform calculations, format data and/or perform any other set top box function.

Set top box 780 may communicate with mass data storage 790 that stores data in a nonvolatile manner and may use jitter measurement. Mass data storage 790 may include optical and/or magnetic storage devices for example hard disk drives HDD and/or DVDs. At least one HDD and/or DVD may include the circuitry of FIG. 1. The HDD may be a mini HDD that includes one or more platters having a diameter that is smaller than approximately 1.8". Set top box 780 may be connected to memory 794 such as RAM, ROM, low latency nonvolatile memory such as flash memory and/or other suitable electronic data storage. Set top box 780 also may support connections with a WLAN via a WLAN network interface 796.

Figure 7E:
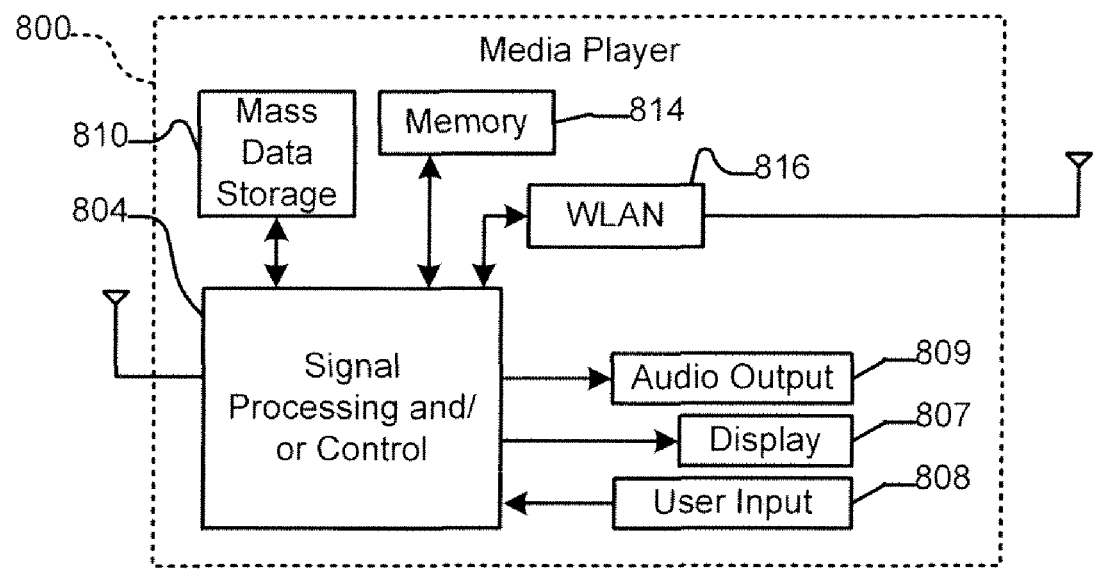

Referring now to FIG. 7E, such techniques may be used in a media player 800. The media player 800 may include either or both signal processing and/or control circuits, which are generally identified in FIG. 7E at 804, a WLAN interface and/or mass data storage 810 of the media player 800. In some implementations, media player 800 includes a display 807 and/or a user input 808 such as a keypad, touchpad and the like. In some implementations, media player 800 may employ a graphical user interface (GUI) that typically employs menus, drop down menus, icons and/or a point-and-click interface via display 807 and/or user input 808. Media player 800 further includes an audio output 809 such as a speaker and/or audio output jack. Signal processing and/or control circuits 804 and/or other circuits (not shown) of media player 800 may process data, perform coding and/or encryption, perform calculations, format data and/or perform any other media player function.

Media player 800 may communicate with mass data storage 810 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD and/or DVD may include the circuitry of FIG. 1. The HDD may be a mini HDD that includes one or more platters having a diameter that is smaller than approximately 1.8". Media player 800 may be connected to memory 814 such as RAM, ROM, low latency nonvolatile memory such as flash memory and/or other suitable electronic data storage. Media player 800 also may support connections with a WLAN via a WLAN network interface 816. Still other implementations in addition to those described above are contemplated.

Figure 7F:
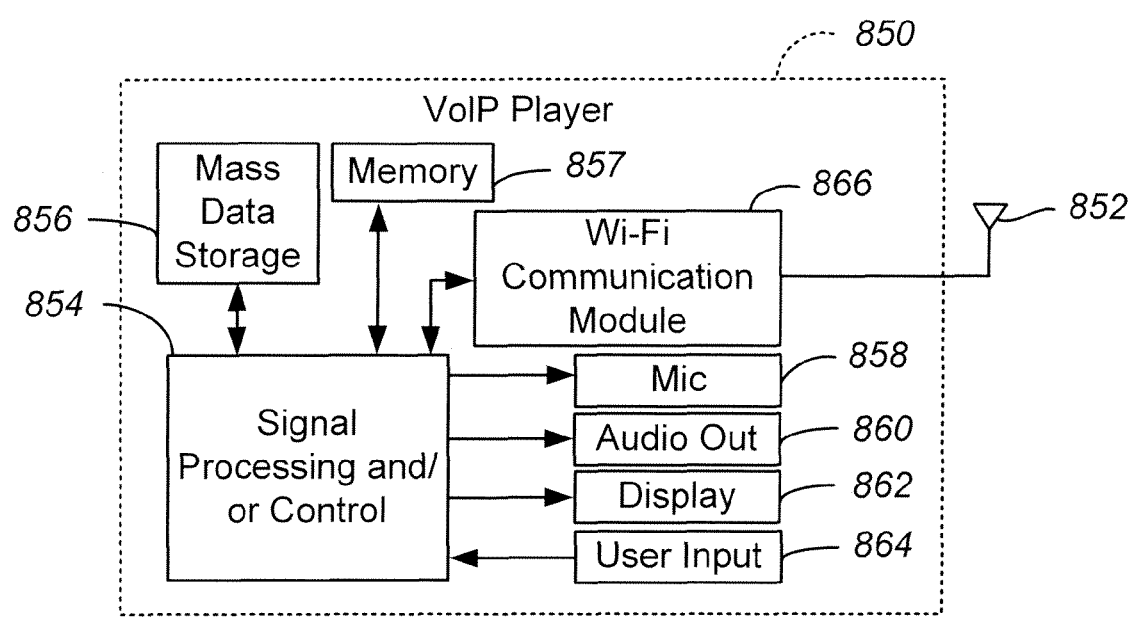

Referring to FIG. 7F, such techniques may be utilized in a Voice over Internet Protocol (VoIP) phone 850 that may include an antenna 852. The VoIP phone 850 may include either or both signal processing and/or control circuits, which are generally identified in FIG. 7F at 854, a wireless interface and/or mass data storage of the VoIP phone 850. In some implementations, VoIP phone 850 includes, in part, a microphone 858, an audio output 860 such as a speaker and/or audio output jack, a display monitor 862, an input device 864 such as a keypad, pointing device, voice actuation and/or other input devices, and a Wireless Fidelity (Wi-Fi) communication module 866. Signal processing and/or control circuits 854 and/or other circuits (not shown) in VoIP phone 850 may process data, perform coding and/or encryption, perform calculations, format data and/or perform other VoIP phone functions.

VoIP phone 850 may communicate with mass data storage 856 that stores data in a nonvolatile manner such as optical and/or magnetic storage devices, for example hard disk drives HDD and/or DVDs. At least one HDD and/or DVD may include the circuitry of FIG. 1 and may utilize jitter measurement. The HDD may be a mini HDD that includes one or more platters having a diameter that is smaller than approximately 1.8". VoIP phone 850 may be connected to memory 857, which may be a RAM, ROM, low latency nonvolatile memory such as flash memory and/or other suitable electronic data storage. VoIP phone 850 is configured to establish communications link with a VoIP network (not shown) via Wi-Fi communication module 866.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. A method of determining in a jitter measurement hardware circuit of an analog-to-digital converter based timing loop a zero crossing time of a signal having an approximately sinusoidal shape with respect to time and in the presence of noise, the method comprising:
   receiving the signal at the analog-to-digital converter based timing loop;
   determining in the jitter measurement hardware circuit at least a first and second point on the signal before crossing a critical level;
   determining in the jitter measurement hardware circuit at least a third and fourth point on the signal following crossing the critical level;
   calculating a first approximate critical level crossing time using at least the first, second, and third points;
   calculating a second approximate critical level crossing time using at least the second, third, and fourth points; and
   averaging the first and second approximate critical level crossing times to determine the zero crossing time.

2. The method of claim 1, wherein the critical level is zero.

3. The method of claim 1, further comprising spacing the first, second, third, and fourth points at equal time intervals.

4. The method of claim 1, further comprising determining a positive or a negative slope for the signal when crossing the critical level.

5. The method of claim 4, further comprising assigning the first, second, and third points x-coordinate values of −1, 0, and +1 respectively, when calculating the first approximate critical level crossing time.

6. The method of claim 5, further comprising assigning the second, third, and fourth points x-coordinate values of −1, 0, and +1 respectively, when calculating the second approximate critical level crossing time.

7. The method of claim 6, wherein calculating the first and second approximate critical level crossing times comprises calculating the first and second approximate critical level crossing times using respective circuits implementing a quadratic formula.

8. The method of claim 7, further comprising selecting a solution of the quadratic formula according to the positive or negative slope for the signal at the critical level crossing.

9. A circuit for implementing a calculation of a zero crossing of an output signal in an optical disk interface, the circuit comprising:
- an analog-to-digital converter providing a digital output corresponding to the output signal;
- a series of delay sample units for collecting signal samples at intervals over time, the series of delay sample units coupled to the analog-to-digital converter;
- a zero crossing detector coupled to the series of delay sample units, the zero crossing detector for determining a zero crossing of the output signal;
- a first hardware circuit implementing a quadratic function, the first circuit coupled to a first set of the series of delay sample units, wherein the first set of the series of delay sample units provides a first set of signal samples and the first circuit provides a first output corresponding to the result of the quadratic function applied to the first set of signal samples;
- a second hardware circuit implementing an other quadratic function, the second circuit coupled to a second set of the series of delay sample units, wherein the second set of the series of delay sample units provides a second set of signal samples such that the first set and second sets of signal samples have at least two common signal samples, the second circuit providing a second output corresponding to the result of the other quadratic function applied to the second set of signal samples; and
- a third circuit for providing an average of the first and second outputs.

10. The circuit of claim 9, wherein the series of delay sample units and two of the at least two common samples are on opposite sides of the zero crossing.

11. The circuit of claim 9, further comprising a slope detector for determining a sign of the slope of the output signal at the zero crossing whereby the first and second circuits provide a single solution to the quadratic function according to the sign of the slope.

12. The circuit of claim 9, further comprising a clock circuit coupled to the series of delay sample units, wherein the clock circuit is used in conjunction with the analog-to-digital converter to collect the signal samples at even time intervals.

13. The circuit of claim 9, wherein each of the first and second circuits comprise a respective preliminary math circuit that calculates coefficients of the quadratic function using values from the first and second sets of signal samples, respectively.

14. The circuit of claim 9, wherein the first circuit is one of a digital signal processor executing computer executable instructions, discrete components, a table, and a processor executing computer executable instructions.

15. An optical disk interface comprising:
- an analog-to-digital converter (ADC) with an output;
- a finite impulse response (FIR) filter coupled to the output of the ADC;
- a detector coupled to an output of the FIR filter;
- a phase detector with an input coupled to the output of the ADC;
- a limit equalizer with an input coupled to the input of the phase detector; and
- a jitter measurement hardware circuit coupled to an application specific output of the optical disk interface being one of the input of the limit equalizer or an output of the limit equalizer comprising:
  - a series of delay sample units for collecting signal samples at intervals over time, the series of delay sample units coupled to the application-specific output in the optical disk interface;
  - a zero crossing detector coupled to the series of delay sample units, the zero crossing detector for determining a zero crossing of the application-specific output;
  - a first circuit implementing a quadratic function, the first circuit coupled to a first set of the series of delay sample units, wherein the first set of the series of delay sample units provides a first set of signal samples and the first circuit provides a first output corresponding to the result of the quadratic function applied to the first set of signal samples;
  - a second circuit implementing an other quadratic function, the second circuit coupled to a second set of the series of delay sample units, wherein the second set of the series of delay sample units provides a second set of signal samples such that the first set and second sets of signal samples have at least two common signal samples, the second circuit providing a second output corresponding to the result of the other quadratic function applied to the second set of signal samples; and
  - a third circuit for providing an average of the first and second outputs.

16. The optical disk interface of claim 15, wherein the application-specific output in the optical disk interface is the input of the limit equalizer when used with a DVD disk system and the output of the limit equalizer when used with a Blu-ray disk system.

17. The optical disk interface of claim 15, wherein the jitter measurement circuit further comprises a slope detector for determining a sign of the slope of the signal samples at the zero crossing whereby the first and second circuits provide a single solution to the quadratic function according to the sign of the slope.

18. The optical disk interface of claim 15, wherein the jitter measurement circuit further includes an arithmetic circuit in each of the first and second circuits, wherein each arithmetic circuit calculates the a, b, and c, coefficients for a quadratic equation $ax^2+bx+c$ using values from the first and second set of signal samples, respectively.

19. The optical disk interface of claim 15, wherein:
- the first set of signal samples comprises two samples on a first side of the zero crossing and one sample on a second side of the zero crossing,
- the second set of signal samples comprises one sample on the first side of the zero crossing and two samples on the second side of the zero crossing, and
- each of the first and second set of signal samples have in common the two samples closest to the zero crossing.

* * * * *